United States Patent

[11] 3,617,534

| [72] | Inventor | George J. Bacsik |
| | | Fanwood, N.J. |
| [21] | Appl. No. | 6,676 |
| [22] | Filed | Jan. 29, 1970 |
| [45] | Patented | Nov. 2, 1971 |
| [73] | Assignee | Esso Research & Engineering Co. |

[54] HYDROCARBON SEPARATION PROCESS
4 Claims, 1 Drawing Fig.

[52] U.S. Cl........................................... 208/310,
208/361, 208/362, 260/676 MS
[51] Int. Cl.......................................... C07c 7/12
[50] Field of Search.................................. 208/310,
361, 362; 260/676 MS

[56] References Cited
UNITED STATES PATENTS

| 2,600,133 | 6/1952 | Simms | 208/310 |
| 2,630,402 | 3/1953 | Miller et al. | 208/310 |
| 3,306,847 | 2/1967 | Mueller | 208/310 |
| 3,461,065 | 8/1969 | Cooper | 208/310 |
| 3,531,400 | 9/1970 | Wehner | 208/310 |

Primary Examiner—Herbert Levine
Attorneys—Pearlman and Stahl and C. D. Stores

ABSTRACT: The high temperatures encountered in heating gas oil fractions containing $C_{15}$–$C_{23}$ hydrocarbons for subsequent separation of the normal paraffins therefrom in a molecular sieve separation process are avoided by separating the $C_{20}$–$C_{23}$ hydrocarbons as bottoms in the presence of 0.4 to 0.8 moles of ammonia per mole of feed as a stripping agent and heating the $C_{19}$ and lower hydrocarbons in the presence of the ammonia whereby the residence time can be reduced and a maximum flashing temperature of 675° F. under 65 p.s.i.g. can be maintained to avoid cracking.

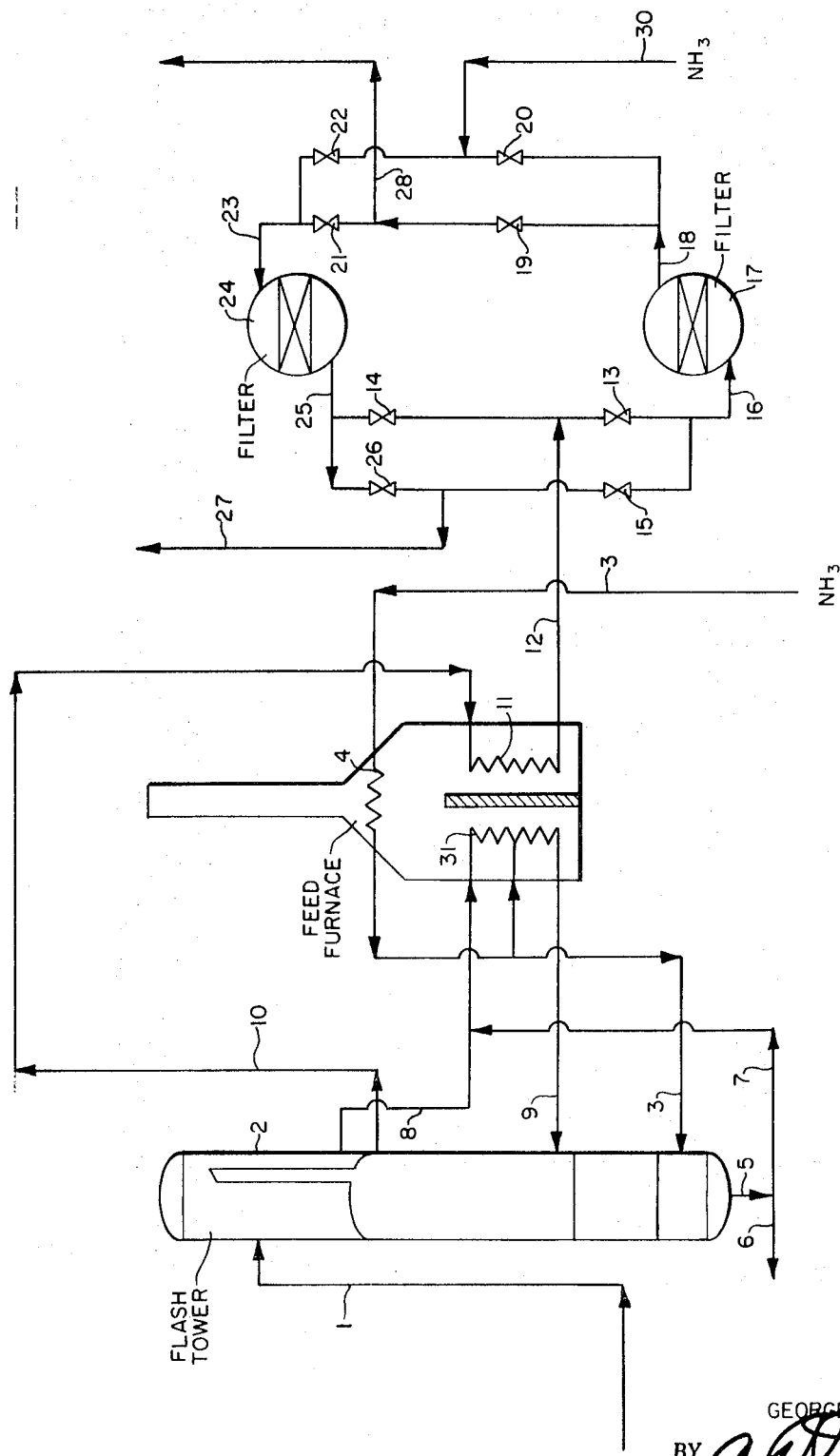

HYDROCARBON SEPARATION PROCESS

BACKGROUND OF THE INVENTION

This invention relates to the separation of straight-chained hydrocarbons from mixtures thereof with branch chained and/or cyclic or aromatic hydrocarbons. More particularly, the present invention relates to the adsorption of relatively heavy straight chain, normal hydrocarbons from isomeric branch chained and cyclic compounds employing a class of natural or synthetic adsorbents termed, because of their structure, molecular sieves.

It has been known for some time that certain zeolites, both naturally occurring and synthetic, have the property of separating normal from isomeric branched chain hydrocarbons, as well as from cyclic and aromatic admixtures. The zeolites have crystal patterns such as to form structures containing a large number of small cavities interconnected by a number of still smaller holes or pores, the latter being of exceptional uniformity of size. Only molecules small enough to enter the pores can be adsorbed, though not all molecules, even though small enough to enter the pores, will be adsorbed. An affinity of the molecule for the adsorbent must be present. The pores may vary in diameter from 3 to 6 Angstrom units to 8 to 15 or more, but it is a property of these zeolites, or molecular sieves, that for a particular sieve the pores are substantially uniform size. The adsorbents with pore sizes of 8 to 15 Angstrom units have a high selectivity for aromatics and nonhydrocarbons. This is due to the polar nature of aromatics and the resulting interaction with the sieve surface. Thus, such adsorbents can be used to separate aromatics and nonhydrocarbons from saturates.

The scientific and patent literature contains numerous references to the adsorbing action of natural and synthetic zeolites. Among the natural zeolites having this sieve property may be mentioned chabasites and analcite. A synthetic zeolite with molecular sieve properties is described in U.S. Pat. No. 2,442,191. An example of a class of synthetic zeolites which is used to separate normal hydrocarbons from branched hydrocarbons is Type A sieve with divalent cations from the alkaline earth sieves, particularly calcium Type A. These adsorbents are described in U.S. Pat. No. 2,882,243. An example of a class of adsorbents which is used to separate aromatics from saturates is Type X sieve with monovalent and divalent cations from the alkaline and alkaline earth sieves, particularly sodium and calcium Type X. These adsorbents are described in U.S. Pat. No. 2,882,244. Zeolites vary somewhat in composition, but generally contain silica, aluminum, oxygen and an alkali and/or alkaline earth element, e.g., sodium and/or calcium, magnesium, etc. Analcite has the empirical formula $NaAlSi_2O_6 \cdot 1H_2O$. Barrer (U.S. Pat. No. 2,306,610) teaches that all or part of the sodium is replaceable by calcium to yield on dehydration, a molecular sieve having the formula

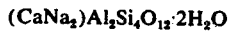

$$(CaNa_2)Al_2Si_4O_{12} \cdot 2H_2O$$

Black (U.S. Pat. No. 2,522,426) describes a synthetic molecular sieve having the formula $4CaO \cdot Al_2O_3 \cdot 4SiO_2$. A large number of other naturally occurring zeolites having molecular sieve activity; i.e., the ability to adsorb a straight chain hydrocarbon and exclude the branched chain isomers, are described in an article, "Molecular Sieve Action of Solids," appearing in Quarterly Reviews, vol. III, pp. 293 and 320 (1949), and published by the Chemical Society (London).

The separation of normal from branched chain or aromatic hydrocarbons or mixtures, either for the purpose of enriching the mixture in branched chain, cyclic or aromatic components, or for isolating and recovering of the normal isomer, has become increasingly important to industry. Thus, in the preparation of jet and diesel fuels, the presence of normal paraffins degrades the freezing point rating. On the other hand, in the manufacture of synthetic detergents such as alkylaryl sulfonates, a straight chain alkyl substituent makes for better detergency and biodegradable characteristics than a branched chain substituent of the same number of carbon atoms. Numerous other examples can be cited.

It should be kept in mind that the process of the invention is useful for separating aromatics and nonhydrocarbons, i.e., impurities from saturated hydrocarbons. For instance, some uses of saturated hydrocarbons (normal, iso, cyclo) are as follows:

In the naphtha range as intermediate quality solvents
In the kerosene range as intermediate quality solvents, high quality kerosene for lamp oil, jet fuel
In the lube range as white oils and high V.I. oils To illustrate the applicability of this invention, reference is made to U.S. Pat. No. 2,899,379. In U.S. Pat. No. 2,899,379 there is disclosed a process for separating branched chain or aromatic hydrocarbons from normal paraffin hydrocarbons. It is disclosed in this patent that normal paraffins would selectively adsorb on molecular sieves and could be subsequently desorbed by treatment with ammonia at temperatures of about 70° to about 600° F., but preferably below 400° F. The ammonia itself is recovered by heating to 600° to 800° F., or the ammonia may be removed by a portion of the sievate itself as suggested by U.S. Pat. No. 3,309,311 issued to Epperly et al., Mar. 14, 1967.

A marked increase in the demand for heavy linear paraffins $C_{15}-C_{19}$ is expected in the very near future. However when trade gas oil or similar feed is used as the source of these hydrocarbons, the thermal conditions are more severe than with lighter materials with the result that cracking occurs in the feed preheater coil.

SUMMARY OF THE INVENTION

In accordance with the present invention the above difficulties can be overcome by providing a feed flash tower ahead of the preheating coil in which 0.4 to 0.8 moles of ammonia per mole of feed is introduced to aid in stripping in order to remove the $C_{20}+$ heavy ends. The ammonia is carried along with the feed through the feed preheater where it serves to lower operating temperatures and residence time thus reducing the tendency toward cracking. This technique allows the heaviest possible linear paraffins to be recovered as limited by the operating temperatures and residence time at the operating temperatures.

BRIEF REFERENCE TO THE DRAWING

The drawing is a diagrammatic representation of one embodiment for carrying out the present invention.

DETAILED DESCRIPTION OF THE DRAWING

Referring now to the drawing, a gas oil is fed by line 1 to feed flash tower 2 into the bottom of which is fed 0.4 to 0.8 moles of ammonia by line 3 and preheater 4. The ammonia strips all the feed boiling below $C_{20}/C_{23}$. The heavy material leaves the bottom of the tower by line 5 and may be withdrawn from the system by line 6 or recycled by line 7 to the unflashed feed stream in line 8 and passed through heating coil 31 and returned to a lower portion of the tower by line 9. Stripped feed and ammonia are withdrawn by line 10 and passed through coil 11 where the temperature is kept below cracking temperature by the presence of the ammonia. The heated feed is removed through line 12 and passes through valve 13 which is open while valves 14 and 15 are closed and then into line 16 from whence it is transported into sieve bed 17. Within bed 17 is a molecular sieve which may be any molecular sieve which has pore openings of 3 to 15 Angstroms or more. At the start of an absorption cycle the sieve and void volume may contain a small amount of residual normal paraffins but they contain a large amount of displacing agent. Normal paraffins are adsorbed on the sieve bed. The sievate or nonabsorbed portion is removed through line 18 and passes through valve 19 which is open while valves 20 and 21 are closed and then into line 28 from whence it is transported to subsequent processing equipment. The sievate composition is that of the feed with the normal paraffins removed. It should be noted that the sievate may be passed through a condenser, which is not shown, in order to separate sievate and displacing agent.

Sieve bed 24 has already been subject to absorption. A displacing agent such as ammonia is used to desorb the sieve and hence to recover the normal paraffins. At the start of the desorption cycle, the sieve and void volume are loaded with normal paraffins and some ammonia. The displacing agent is introduced into sieve bed 24 through line 30 and passes through valve 22 which is open while valves 20 and 21 are closed and then into line 23 from whence it is transported into sieve bed 24. Within bed 24 is a molecular sieve which may be any molecular sieve which has pore openings of 3 to 15 Angstrom or more. The displacing agent displaces the normal The displaced normal paraffins together with some displacing agent leave sieve bed 24 through line 25 and pass through valve 26 which is open while valves 14 and 15 are closed and then into line 27 from whence they are transported to subsequent processing equipment. The mixture in line 27 is cooled and the normal paraffins are condensed and separated from the displacing agent by means not shown.

This is a cyclic process. During the next cycle, sieve bed 24 will be used for absorbing normal paraffins from the feed while sieve bed 17 undergoes displacement of absorbed normal paraffins.

Typical feeds which may be used in the process of this invention are set forth below:

TYPICAL FEEDS

| | A | B |
|---|---|---|
| n-Paraffin Content, Wt. % | 15.6 | 14.8 |
| n-Paraffin Distribution, Wt. % | | |
| n-$C_9$- | 1.0 | 1.0 |
| N-$C_{10}$ | 1.4 | 1.9 |
| N-$C_{11}$ | 2.2 | 3.0 |
| N-$C_{12}$ | 4.2 | 5.0 |
| N-$C_{13}$ | 5.4 | 6.7 |
| n-$C_{14}$ | 8.4 | 8.1 |
| n-$C_{15}$ | 15.1 | 11.8 |
| n-$C_{16}$ | 16.9 | 13.0 |
| n-$C_{17}$ | 15.2 | 13.8 |
| n-$C_{18}$ | 10.9 | 10.3 |
| n-$C_{19}$ | 9.1 | 8.7 |
| n-$C_{20}$ | 5.7 | 6.7 |
| n-$C_{21}$ | 3.4 | 4.8 |
| n-$C_{22}$ | 1.1 | 3.4 |
| n-$C_{23}$ | | 1.8 |
| Distillation, °F. (ASTM) | | |
| IBP/5% | 396/452 | 361/417 |
| 10%/20% | 478/500 | 455/497 |
| 30%/40% | 520/532 | 519/537 |
| 50%/60% | 543/555 | 553/570 |
| 70%/80% | 568/582 | 586/606 |
| 90%/95% | 604/622 | 634/658 |
| DP/FBP | 632/638 | 664/668 |
| Gravity, °API | 34.9 | 35.4 |
| Bromine No. | 0.695 | 1.057 |
| Sulfur by X-ray p.p.m. | 410 | 2,500 |
| Mercaptan Sulfur, p.p.m. | 2 | 3 |

The displacing agent is defined as a polar or polarizable material having an appreciable affinity for the zeolitic adsorbent compared with the material desired to be desorbed. This displacing agent will generally have a heat of desorption approximately equal to the material it is desired to desorb. Displacing agents are also referred to as desorbents, displacing agents and desorbing mediums. Suitable displacing agents for the process of this invention include $SO_2$, ammonia, carbon dioxide, $C_1$-$C_5$ alcohols such as methanol and propanol, glycols such as ethylene glycol and propylene glycol, halogenated compounds such as methyl chloride, ethyl chloride, methyl fluoride, nitrated compounds such as nitromethane, and the like. Preferably, the displacing agents are used in a gaseous state. A preferred displacing agent has the general formula:

wherein $R_1$, $R_2$ and $R_3$ are selected from the group consisting of hydrogen and $C_1$-$C_5$ alkyl radicals.

Thus, the desorbing material includes ammonia and the $C_1$-$C_5$ primary, secondary and tertiary amines with ammonia being preferred and the $C_1$-$C_5$ primary amines being next in order of preference. Examples of preferred primary amines include ethylamine, methylamine, butylamine and the like. Of course the displacing agent used must have its critical dimension small enough to enter the molecular sieve being used.

EXAMPLE 1

The effect of ammonia injection and removal of the $C_{20}/C_{23}$ heavy portion of the feed on the temperature in the feed flash zone under 60 p.s.i.g. is shown in the following table.

FEED FLASHING STUDY
[Flash zone=60 p.s.i.g.]

| Trade gas oil | Whole | Without $C_{20}/C_{23}$ tail |
|---|---|---|
| Flash zone temperature, °F.: | | |
| Ammonia injection: | | |
| None | 749 | 703 |
| 0.4 mole/mole feed | 714 | 678 |
| 0.8 mole/mole feed | 692 | 656 |
| Ammonia injection, M#/hr.: | | |
| 0.4 mole/mole feed | 15.0 | 14.2 |
| 0.8 mole/mole feed | 30.0 | 28.4 |
| Inj. $NH_3$ compression, ΔBHP: | | |
| 0.4 mole/mole feed | +120 | Base |
| 0.8 mole/mole feed | +2,370 | +2,140 |

The above date show that ammonia can be used effectively as a coil inert gas and stripper gas to soften operating temperatures and, thereby, maximize the carbon number of material which can be retained in the feed to the molecular sieve. The study shows that the quantity of ammonia required for the adsorption cycle (0.4 moles $NH_3$/mole feed) is about the optimal required for feed inerting and stripping. In short, all of the $C_{20}/C_{23}$ material must be eliminated from the feed to the molecular sieves when flash zone conditions are limited to the reasonable values of 675° F. and 60 p.s.i.g. Flow rates and properties of the TGO fractions are presented in the following table.

TGO FEED STREAM

| | Total TGO | Feed to molecular sieve | $C_{20}/C_{23}$ tail |
|---|---|---|---|
| L.V., percent | 100.0 | 86.9 | 13.1 |
| Flow: | | | |
| B./s.d. at 60° F | 39,400 | 34,200 | 5,200 |
| M#/hr | 488.0 | 412.1 | 66.9 |
| Moles/hr | 2,330 | 2,080 | 250 |
| MM#/hr. (91% S.F.) | 3,900 | 3,360 | 540 |
| Properties: | | | |
| °API | 35.1 | 36.2 | 28.4 |
| #/gal. at 60° F | 7.07 | 7.03 | 7.37 |
| MW | 210 | 203 | 268 |

The present invention having thus been fully described and illustrated and the advantages of the same given what is claimed as new, useful and unobvious and desired to be secured by Letters Patent is:

1. A molecular sieve separation process wherein a feed stream is passed into a molecular sieve separation zone and at least a portion of said feed is absorbed in said zone and the remaining nonadsorbed portion of said feed stock passes out of said zone as sievate which comprises:
   a. passing a hydrocarbon feed stream containing a heavy portion of at least $C_{20}$-$C_{23}$ into a stripping zone,
   b. introducing ammonia into the bottom of said stripping zone to separate a light material containing less than 20–23 carbon atoms,
   c. passing said light material and ammonia through a heating coil and flashing them at a temperature no greater than 675° F. under 60 p.s.i.g., and
   d. introducing said heated feed into said molecular sieve separating zone as said feed stream.

2. The process of claim 1 in which the adsorbed hydrocarbon is
   e. displaced with a displacing agent whereby said displacing agent is adsorbed on said bed f. said displacing agent is displaced from said bed by passing sievate over said bed until a substantial portion of said displacing agent is removed.

3. The process according to claim 2 wherein the said displacing agent is

wherein $R_1$, $R_2$ and $R_3$ are selected from the group consisting of $C_1$–$C_5$ alkyl radicals and hydrogen.

4. The process of claim 3 in which the displacing agent is ammonia.